3,412,376
LOW-FREQUENCY SEISMOMETER
Walter P. Johnson III, Houston, Tex., assignor to Mark
 Products, Inc., Houston, Tex., a corporation of Texas
Filed May 10, 1967, Ser. No. 637,426
6 Claims. (Cl. 340—17)

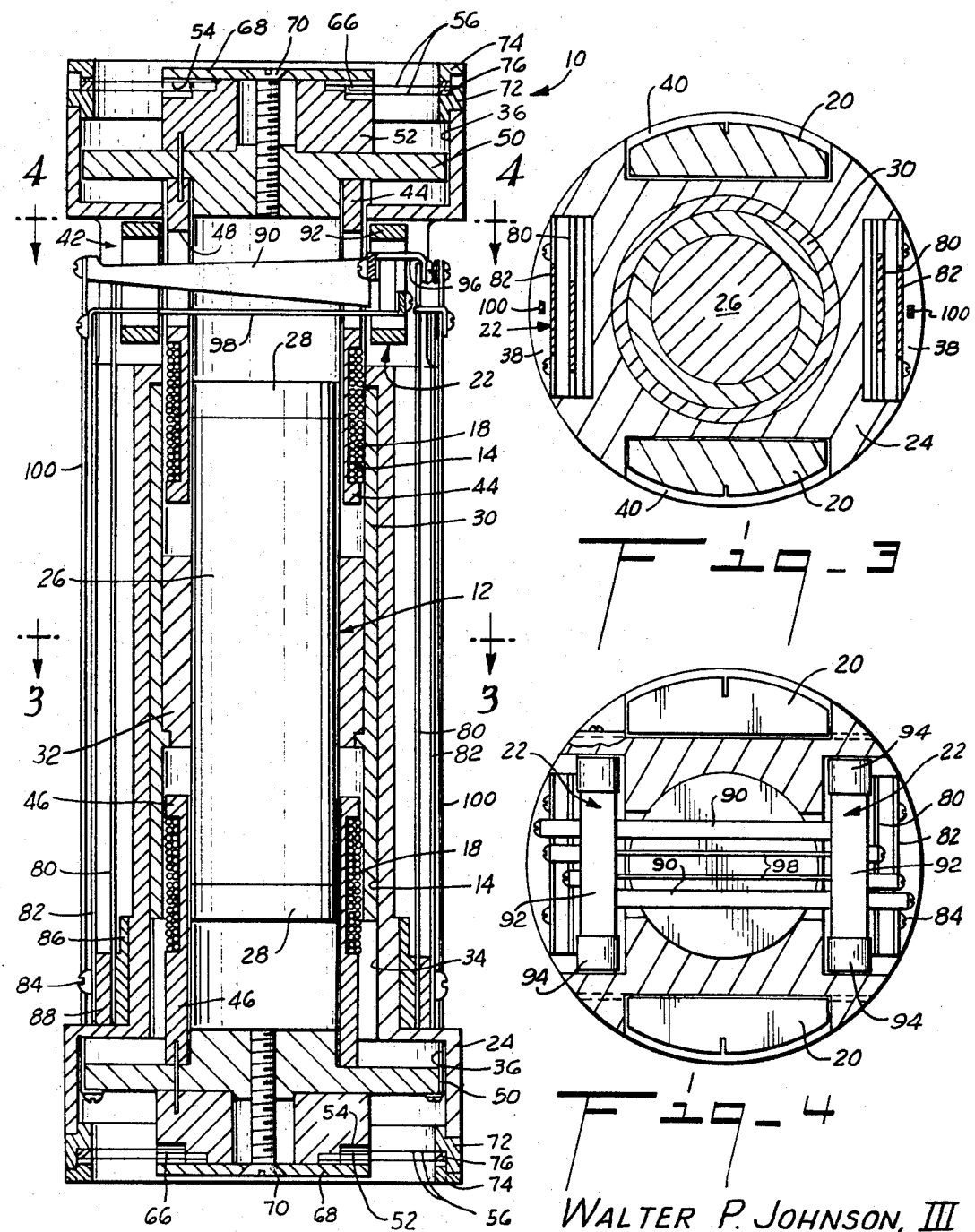

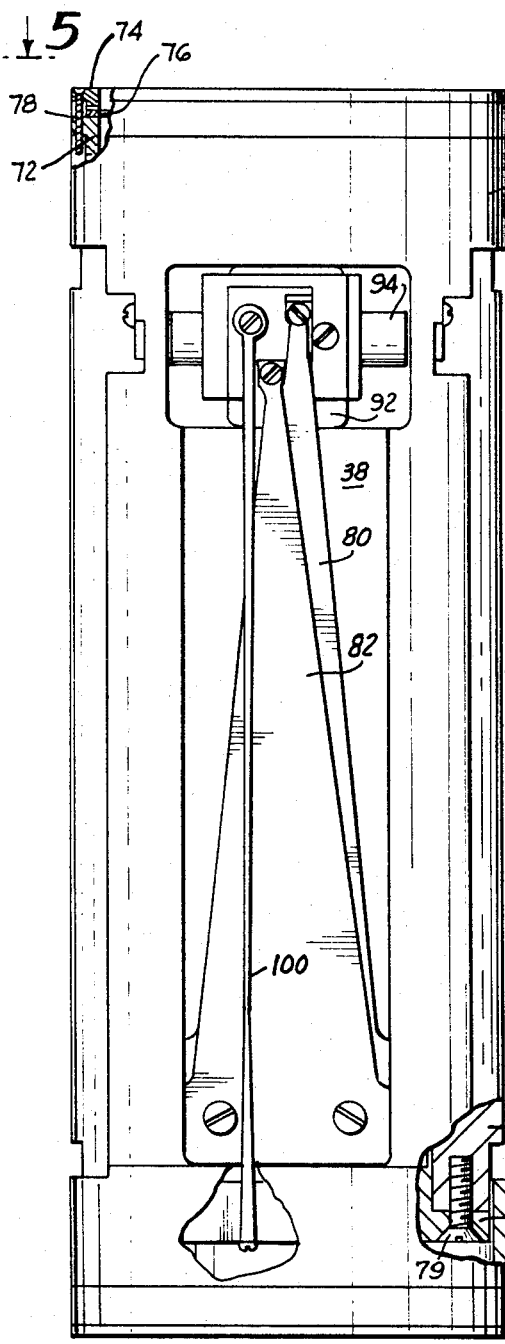
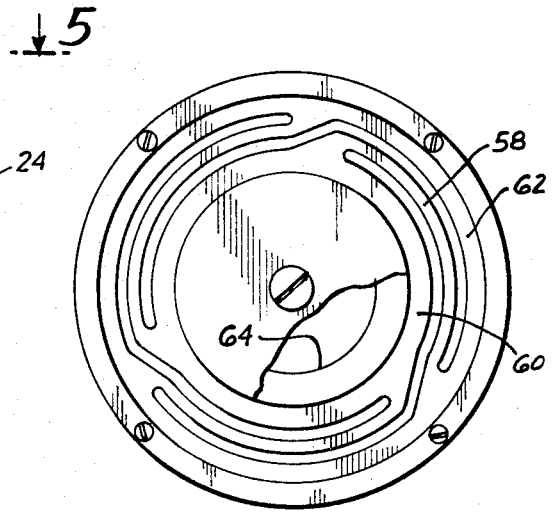
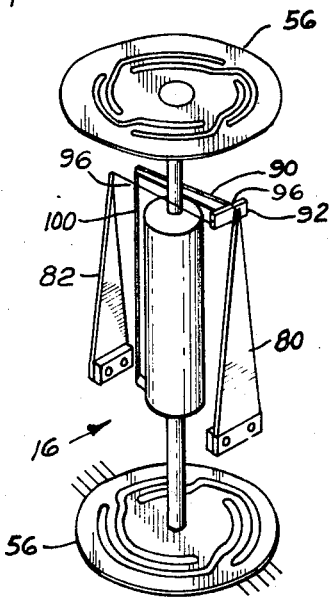
Walter P. Johnson, III
INVENTOR.

ABSTRACT OF THE DISCLOSURE

A low-frequency, moving coil, electromagnetic type seismometer in which a pair of balanced coils of a mass-coil assembly are concentrically suspended in annular air gaps of a permanent magnetic field by means of a spring suspension system that permits the coils a freedom of movement only coaxial with the axis of the air gaps. The spring suspension system is formed of a pair of spring-spiders at each end of the mass-coil assembly maintaining the coaxial alignment and movement and two pair of cantilever beams which, acting through balanced, pivoted, lever arms are connected by ligatures to support the weight of the mass-coil assembly and provide the natural frequency of seismometer.

BACKGROUND OF THE INVENTION

This invention relates to a short-period or low-frequency seismometer having a diameter which permits its use in seismic boreholes, and more particularly to a novel spring suspension for transducers in which one element moves relative to a second element.

Seismometers, or geophones as they are commonly known in the oil exploration industry, are used extensively to convert seismic oscillations of the earth into electrical energy. In other words, mechanical movements are converted into equivalent electrical signals which can be utilized to provide a recordable representation of the earth's movement.

Although there have been numerous types of seismometers developed and used, the most common type presently in use is the electromagnetic, moving coil type which consists of a mass-coil assembly and a magnet assembly, one rigidly fixed with respect to the earth and the other suspended from a fixed support by a spring suspension system. Relative motion between the mass-coil assembly and the magnet assembly produces an electromotive force across the terminals of the coil which is proportional to the velocity of motion. In the moving coil type of electromagnetic seismometer, the mass-coil assembly is usually the inertial element of the instrument and is suspended by the spring suspension system in an annular air gap of a constant magnetic field.

The seismometer contains at least two degrees of freedom; the first is the undampened natural frequency which generally dimensions the lowest response point and is determined by:

$$f_n = \frac{1}{2\pi}\sqrt{\frac{K}{M}}$$

where $f_n$ is the natural frequency
$K$ is the constant of the spring suspension system
$M$ is the weight of the mass-coil assembly the second is the highest frequency of response and is determined by the self-resonance of the spring suspension system.

The purpose of the seismometer is not only to detect seismic movements but to provide signals of sufficient magnitude so that a proper recording may be obtained. Accordingly, it is necessary to maintain the transduction constant at a proper level. The transduction constant is determined by:

$$E = BLV \cdot 10^{-8}$$

which may be transposed to $$G = E/V = BL \cdot 10^{-8}$$

where $E$ = Volts
$B$ = Flux density-gauss
$L$ = Conductor length-cm.
$V$ = Velocity (speed)-cm./second
$G$ = Transduction constant-volts/cm./second Accordingly, in order to have a satisfactory level of transduction constant it is necessary to utilize a fairly heavy mass.

In order to support the mass at low frequencies, a very low value of spring constant is required commensurate with a large lifting force. This naturally results in a low self-resonance frequency, the limit determined by the stress in the lift spring. This frequency must then be compromised with the instability of high stresses. While the self-resonance frequency can be raised by the use of mechanical levers with frictional pivots, a new limit determined by the natural frequency of the lever-pivot system results.

For earth crustals studies, earthquake detection and nuclear explosion detection and other scientific studies, a low-frequency range such as 1 c.p.s. is required. In a one cycle per second seismometer, the mass deflects at a rate of approximately ten inches/gravity and practical difficulties have been encountered in making stable, small-diameter, one cycle per second, seismometers. In addition, springs capable of such a rate of deflection have self-resonance at rather low frequency, in some instances as low as 12 cycles per second.

The oil exploration type geophone is very rugged, has a relatively wide linear band width and, for the higher frequencies which are normally used in seismic surveying, is a very stable instrument. Accordingly, it is very desirable that a low-frequency or short-order period range seismometer with a frequency such as 1 c.p.s., having a diameter enabling the instrument to be used in seismic boreholes, be developed which is rugged in construction, stable in operation and has a sufficiently broad band width of linear response to assure a satisfactory record.

It is the object of the present invention to provide a novel spring suspension system for a seismometer which will permit the construction of a small-diameter, low-frequency seismometer that is stable in operation, that does not approach metastability, that utilizes springs in which the stresses are greatly minimized and that produces a linear response over a wide band operating range while at the same time the power transduction constant of the geophone is maintained to provide a desired signal level.

SUMMARY OF THE INVENTION

The seismometer of the present invention is of the moving coil, electromagnetic type and, accordingly, a mass-coil assembly formed of a pair of balanced annular coils and an inertial mass is concentrically suspended by a spring suspension system about a magnetic assembly with the balanced coils located in annular air gaps thereof. The only freedom of movement of the coils permitted by the spring suspension system is coaxial with the axis of the air gaps. The spring suspension system is formed of a pair of spring-spiders at each end of the mass-coil assembly which maintain the mass-coil assembly in coaxial alignment with the annular air gaps and two pair of cantilever beams which, acting through balanced, pivoted, lever arms and ligatures, support the weight of the mass-coil assembly and provide the proper compliance for the desired frequency.

Further, in accordance with one embodiment of the invention by utilizing triangularly shaped cantilever beams to support the mass-coil assembly, the maximum stress in any part of the spring is very nearly equal to the average stress. Moreover, since the design stress for a cantilever beam is a combination of tension and compression rather than shear a higher design stress can be safely used than with a coil spring which is one common method of forming a dual spring system for a seismometer. Accordingly, a low-frequency, i.e., 1 c.p.s., seismometer has been developed which is stable in operation over a relatively wide band width.

BRIEF DESCRIPTION OF THE DRAWINGS

FIG. 1 is a cross-sectional view of low-frequency seismometer constructed in accordance with the present invention;

FIG. 2 is an elevational view of the seismometer illustrated in FIG. 1 looking into a pair of the cantilever springs;

FIG. 3 is a sectional view taken along lines 3—3 of FIG. 1;

FIG. 4 is a sectional view taken along lines 4—4 of FIG. 1;

FIG. 5 is a plan view of an end of the seismometer; and

FIG. 6 is an exploded view in perspective of a portion of the novel spring suspension system of this invention.

DESCRIPTION OF THE PREFERRED EMBODIMENT

As illustrated in FIG. 1, a moving coil, electromagnetic seismometer, which is designated generally by 10, is formed of a permanent magnet assembly 12 having annular air gaps 14, a mass-coil assembly 16 formed of a pair of balanced annular coils 18 and a pair of mass elements 20 (FIG. 3), and a spring suspension system 22.

The magnet assembly 12 is rigidly attached to a frame 24 with the mass-coil assembly 16 suspended about the magnet assembly 12 and maintained concentric therewith by the spring suspension system 22. The annular coils 18—18 are positioned in the annular air gaps 14—14 with the spring suspension system 22 limiting movement thereof to coaxial. Accordingly, movement of the earth results in movement of the coils 18—18 relative to the annular air gaps 14—14 and in the production of electromotive forces which produce electrical signals equivalent to the movements of the earth. In this respect, the seismometer 10 of the present invention is similar to prior art electromagnetic seismometers; however, the spring suspension system 22 of the present invention is novel and permits the construction of the low-frequency seismometer 10 which is stable in operation and which has a smaller diameter than has been possible by a utilization of spring suspension systems of the prior art.

As mentioned, the magnet assembly 12, which is formed of a cylindrical permanent magnet 26 having inner end pole pieces 28—28 and an annular outer pole piece 30, is rigidly connected to the frame 24 of the seismometer 10. As can be seen in FIG. 1, the annular outer pole piece 30 is fixedly attached to the frame 24 and an annular magnet support member 32 secured to the annular outer pole piece 30 rigidly fixes the permanent magnet 26 to the frame 24. The annular coaxial spaces between the end pole pieces 28—28 of the magnet 26 and the outer annular pole piece 30 form the coaxial annular air gaps 14—14 in which a constant magnetic field is produced by the magnet assembly 12.

As can best be seen in FIGS. 1 and 2, the frame 24 is generally cylindrical and has a cylindrical bore 34 in which the magnet assembly 12 is located. The ends 36—36 of the bore 34 are of enlarged diameter and receive the outer ends of the coils 18—18 of the mass-coil assembly 16 and portions of the spring suspension system 22. There are four cut-out portions in the peripheral surface of the hollow cylindrical frame 24. Two of the cut-out portions 38—38 are parallel with each other and receive portions of the spring suspension system 22, the other two cut-out portions 40—40 which are normal to the portions 38—38 are also parallel with each other and receive the mass portions 20—20 of the mass-coil assembly 16. The frame 24 also has transverse openings 42, the purpose of which will be explained subsequently.

As mentioned, the annular coils 18—18 are positioned in the annular air gaps 14—14 of the magnet assembly 12. As can be seen from FIG. 1, the coils 18 are wound on annular bobbins 44 and 46, the outer portions of which extend into the end portions 36—36 of the central opening 34 of the frame 24. The upper bobbin 44 has an opening 48 to accommodate a portion of the spring suspension system 22, as will be explained subsequently. Circular end plates 50—50 are attached to the bobbins 44 and 46. The end plates 50—50 are located in the end portions 36—36 of th central bore 34. Extending outwardly from each end plate 50 is an inner spring support member 52 which has a peripheral groove 54 to receive a pair of spring-spiders 56—56 of the spring suspension system 22.

The spring-spiders 56 are typical geophysical springs and are each formed of a disk of beryllium-copper from which is etched out three curved spring arms 58 which attach a central portion 60 to an outer peripheral edge portion 62. The central portion 60 is provided with a central opening 64. Each spring-spider 56 may be installed flat, or preformed to obtain the merits of this invention.

The central portion 60 of each spring-spider 56 is located in the peripheral groove 54 of each inner spring support member 52. The pair of spring-spiders 56 located in each groove 54 are separated by a spacer 66. A clamp member 68 positioned at the outer end of the inner spring support member 54 clamps the central portion 60 of the spring-spiders 56 to the inner spring support member 52 by a threaded member 70 which is threadedly engaged with a threaded aperture in the circular end plate 50.

The peripheral edges of the spring spiders 56 are attached to the end of the frame 24 by outer spring support member 72 and outer spring clamp 74 with each spring-spider 56 of the pair maintained in separation by a spacer 76. The assembly may be attached to the frame 24 by a plurality of threaded members 78 which are threadedly engaged with threaded apertures in the wall of the frame 24.

The two coils 18—18 are tied together by the parallel pair of mass portions 20—20 which are positioned in the cut-out portions 40—40 of the frame 24. As can be seen in FIG. 2, the mass portions 20—20 are attached to the circular end plates 50—50 by threaded members 79 which are threadedly engaged with threaded apertures in the mass portions 20—20. With the mass portions 20—20 attached to the end plates 50—50 the mass-coil assembly 16 is formed and movement of the mass-coil assembly 16 results in equal movements of the coils 18—18 in the air gaps 14—14 of the magnet assembly 12. The coils 18—18 may be balanced and of humbucking construction as is well known in the art. Signals developed by the coils 18—18 are transmitted to contacts which may be attached to a cable (not shown). The spring-spiders 56 function to maintain the movement of the mass-coil assembly coaxial with the axis of the frame 24 whereby the coils 18 move coaxially in the air gaps 14—14. In order to support the mass-coil assembly 16, the spring suspension system 22 has two pairs of cantilever beams 80 and 82 which are attached to the cut-out portion 38 of the frame 24 by threaded members 84 which are threadedly engaged with threaded apertures in the frame 24. As can be seen from FIG. 2, the cantilever beams are generally triangular in shape. Spacers 86 separate the inner cantilever beams 80 from the frame 24 and spacers 88 separate the outer cantilever beams 82 from the inner cantilever beams 80. As can be seen in FIG. 1, inner cantilever beams 80 are slightly longer than outer cantilever beams 82. As also can be seen in FIG. 1, the two pairs of cantilever beams are parallel to each other. Each pair of cantilever beams 80 and 82 are attached to the mass-coil assembly 16 through a pair of opposed pivoted levers 90 which extend from a lever frame 92 which is located in the transverse opening 42 in the frame 24 and which are attached to the frame 24 by pivots 94. The pivoted levers 90 extend through the transverse opening 48 of the upper bobbin 44 and are normal to the parallel pairs of cantilever beams. Each frame 92 of the lever 90 is attached to a pair of the cantilever beams by a pair of ligatures 96 and 98. The ligature 96 is attached to the upper portion of the frame 92 and the longer inner beam 80, and the ligature 98 is attached to the lower portion of the frame 94 and the shorter outer beam 82. The cantilever beams balance the levers 90—90; therefore, there are only torsional forces acting on the pivots 94. A ligature 100 extends from the end of each pivoted lever 90 to the mass-coil asembly 16. Accordingly, the spring suspension system 22 is formed of two pair of geophysical spring-spiders 56 which are attached to each end of the mass-coil assembly 16 and which cause the mass-coil assembly to move coaxial with the magnet assembly 12 whereby the coils 18—18 of the mass-coil assembly 16 move coaxial in the annular air gaps 14—14 and two parallel pair of cantilever beams which, acting through the pivoted levers 90 and ligatures 100, support the weight of the mass-coil assembly 16 and provide the compliance necessary for the desired natural frequency. FIGURE 6 shows the spring suspension assembly of this invention in perspective. Only one pair of beams are shown for clarity.

Prior art one-cycle seismometers for use in seismic boreholes commonly use coil springs. The deflection of a coil spring is:

$$Y = 8WD^3/Gd^4 \qquad (E-1)$$

where
Y is the deflection
W is the weight of the suspended mass
D is the diameter of the coil spring
d is the diameter of the wire forming the coil spring
n is the number of effective turns
G is shear modulus The lowest self-resonant frequency ($f_0$) of a coil spring is given for steel for simplicity:

$$f_0 = 7 \cdot 10^3 / nD^2 \qquad (E-2)$$

The stress in a coil spring is principally shear ($S_s$):

$$S_s = 8WDK/\pi d^3 \qquad (E-3)$$

where K is the spring constant.
The merit factor (M) of a spring is:

$$M = Wf_0/S_s \qquad (E-4)$$
$$= 7 \cdot 10^3 \pi / GK$$
$$= 2.2 \cdot 10^4 / G$$
$$= 2 \cdot 10^{-3} \qquad \text{(for steel)}$$

The seismometer 10 uses a triangle cantilever for which the deflection-stress relation is:

$$Y/S = L^2/Et \qquad (E-5)$$

where
L is the length
t is the thickness
E is Young's Modulus of Elasticity

The weight of the suspended mass is greater than the spring weight by a large factor. Assuming the ligatures 100 between the cantilever beam and the mass-coil assembly as having negligible strain, the cantilever beam may be handled as rigidly supported on the end where (b), the width of the base, is finite and simply supported on the end where (b) at the tip is equal to zero. The self-resonance can be calculated by determining the deflection of the cantilever beam due to its own weight. This deflection ($Y_f$):

$$Y_f = W_f L^3 / 37 b t^3 E \qquad (E-6)$$

$W_f$ = spring weight
The spring weight is the product of its density and volume. For steel:

$$W_f = 0.283 \frac{b}{2} Lt \qquad (E-7)$$
$$= 0.142 b L t$$

Combining with (E-6)

$$Y_f = L^4 / 260 E t^2 \qquad (E-8)$$

A very close approximation of frequency related to deflection (for one g of force) is:

$$f \cdot \simeq \sqrt{10/Y_f} \qquad (E-9)$$

The lowest self-resonance is therefore:

$$f_0 = \sqrt{2.6 \cdot 10^3 E t^2 / L^4} \qquad (E-10)$$

To obtain the merit factor (M) Equation E-5 is multiplied by Equation E-10:

$$M = \frac{Y f_0}{S_t} = \sqrt{\frac{2.6 \cdot 10^3}{E}} \qquad (E-11)$$

$S_t$ = tensile stress for steel
$$E = 30 \cdot 10^6$$
$$M = 9.3 \cdot 10^{-3} \qquad (E-12)$$

Relating this to E-4 will show that the seismotor 10 will have a larger band width than any geophone with a coil lift spring for a given stress. It will be noted that maximum stresses in a triangular cantilever beam are tension and compression, whereas the maximum stress in and a coil (or helical) spring is shear. Since the safe tensile or compressive stress for most spring materials is higher than the allowable shear stress, the improvement is actually greater.

Moreover, the cantilever beams need not be arranged symmetrically as assumed in the above description. They could be mounted so the ligatures 96 and 98 exert their pull on the beams at an angle. This would tend to twist as well as bend the beams around their longitudinal axes which would raise their self-resonance with negligible change in spring rate (the value of Y). Such a twist would obviously increase the rigidity as far as the self-resonance is concerned and add a shear stress component. Since the exact value of shear is not known it has been held to a possible maximum of 5000 p.s.i. for the seismometer 10.

By using the above-described construction, a one-cycle per second geophone has been constructed which has a diameter of 4.5″ and which is only 13⅝″ in height. The seismometer supports a suspended mass-coil assembly of 3650 grams. The natural frequency is stable over the coil excursion, with a frequency change of less than .02 c.p.s. at 7° tilt from vertical. The seismometer has an output of 5 volts/inch/second with a 500 ohm coil and 50 volts/inch/second with a 50,000 ohm coil and a suspension resonance of 170 c.p.s.

Accordingly, it can be seen that by utilizing two parallel pair of cantilever beams to provide the compliance of the spring suspension system and support the weight of the mass-coil assembly it is possible to construct a one cycle per second seismometer having a small diameter, which is stable in operation, has a wide linear band width response and a desired level of signal output, which is rugged in construction and can be transported without being clamped.

Although the novel spring suspension system of the present invention is particularly advantageous for use in a short-period or low-frequency seismometer, it is to be understood that the spring suspension system may be utilized in any type of transducer wherein one element moves relative to another element. As can be seen, the geophysical spring-spiders maintain the one element coaxial while the two pair of cantilever beams acting through the balanced pivots, levers and ligatures support the weight and provide the required compliance.

From the foregoing it can be seen that this invention is one well adapted to attain all the ends and objects hereinabove set forth, together with other advantages which are obvious and which are inherent to the apparatus.

It will be understood that certain features and subcombinations are of the utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A transducer having a first element fixedly supported, a second element movable relative to the first element and a spring suspension system supporting the second element relative to the first, said spring suspension system formed of a pair of spring spiders attaching the second element to the first element and maintaining coaxial movement between the second element and the first element, at least one pair of cantilever beams said cantilever beams being in opposed, generally parallel relation, one on each side of the second element, a pivoted, cross hinge lever for each pair of cantilever beams, the lever positioned at one end of the second element between and normal to the opposed cantilever beams, means attaching the pivoted end of the pivoted cross hinge lever to the two opposing cantilever beams, thereby balancing the load across the pivot, and a ligature attached to the free end of the lever and the second element.

2. A low-frequency, moving coil, electromagnetic seismometer, comprising a permanent magnet assembly having an annular magnetic air gap, a mass-coil assembly formed of an inertial mass and an annular coil, a spring suspension system suspending the coil in the air gap providing the coil with freedom of movement only coaxial with the axis of the air gap, the spring suspension system being formed of spring-spiders attached to the mass-coil assembly maintaining the movement of the mass-coil assembly coaxial with the axis of the annular air gap, two pair of cantilever beams in spaced parallel relation, one pair on each side of the mass-coil assembly, a pair of pivoted, cross hinge levers positioned on top of the mass-coil assembly between and normal to the parallel pairs of cantilever beams, the pivoted end of the pivoted cross hinge lever attached to two opposing cantilever beams thereby balancing the load across the pivots, and a ligature attached to the free end of each lever and the mass-coil assembly.

3. The seismometer specified in claim 2 characterized in that there is a coaxial pair of annular air gaps and a pair of annular coils, one of which is positioned in each air gap.

4. A low-frequency, moving coil, electromagnetic seismometer comprising a frame, a permanent magnet assembly rigidly attached to the frame, the permanent magnet assembly having a pair of annular air gaps, one located at each end of the magnet assembly, a mass-coil assembly formed of an inertial mass and a pair of annular coils, one coil positioned in each annular air gap, a spring suspension system supportingly suspending the mass-coil assembly about the permanent magnet assembly and providing the coils with freedom of movement only coaxial with the axis of the annular air gaps, the spring suspension system being formed of two pairs of spring-spiders and two pair of cantilever beams, the peripheral edges of the spring-spiders being attached to the ends of the frame and the ends of the mass-coil assembly being attached to the central portions of the spring spiders, a pair of cantilever beams attached to each side of the frame in parallel relation, a pair of cross hinge levers pivotally attached to the frame adjacent to the upper end of the mass-coil assembly and extending through an opening in the mass-coil assembly, the levers being between and normal to the parallel pairs of cantilever beams, the pivoted end of each cross hinge lever attached to two opposing cantilever beams by a pair of ligatures thereby balancing the load across the pivot, the free end of the cross hinge lever attached to the mass-coil assembly by a ligature.

5. The transducer of claim 1 in which the beams are made of flat, relatively thin plate and are triangularly shaped having sides that converge toward the free ends of the beams to keep substantially uniform the tensile and compressive stresses produced in the beams by the weight and movement of the second element.

6. The transducer of claim 5 in which the means attaching the beams to the pivotal end of the cross hinge lever transmit the load across the pivot to the beams at an angle to their longitudinal axes to produce a slight twisting of the beams.

No references cited.

RODNEY D. BENNETT, *Primary Examiner.*

C. E. WANDS, *Assistant Examiner.*